(12) United States Patent
Lejin P J (10) Patent No.: US 12,147,820 B2
(45) Date of Patent: Nov. 19, 2024

(54) MULTI-INSTANCE USER INTERFACE MANAGEMENT

(71) Applicant: Salesforce, Inc., San Francisco, CA (US)

(72) Inventor: Jose Lejin P J, Bengaluru (IN)

(73) Assignee: Salesforce, Inc., San Francisco, CA (US)

( * ) Notice: Subject to any disclaimer, the term of this patent is extended or adjusted under 35 U.S.C. 154(b) by 0 days.

(21) Appl. No.: 17/947,998

(22) Filed: Sep. 19, 2022

(65) Prior Publication Data

US 2024/0095045 A1 Mar. 21, 2024

(51) Int. Cl.
*G06F 9/451* (2018.01)

(52) U.S. Cl.
CPC .................... *G06F 9/451* (2018.02)

(58) Field of Classification Search
CPC ..................................................... G06F 9/451
See application file for complete search history.

(56) References Cited

U.S. PATENT DOCUMENTS

| | | | | |
|---|---|---|---|---|
| 9,529,487 B1 * | 12/2016 | Bottner | ................ | G06F 3/0483 |
| 9,547,525 B1 * | 1/2017 | Trainor | ............... | G06F 3/04842 |
| 9,904,536 B1 * | 2/2018 | Qian | ........................ | G06F 8/38 |
| 2006/0230356 A1 * | 10/2006 | Sauve | ................... | G06F 3/0481 |
| | | | | 715/777 |
| 2007/0143702 A1 * | 6/2007 | Maggi | ..................... | G06F 9/451 |
| | | | | 715/779 |
| 2009/0204915 A1 * | 8/2009 | Yamagami | ............. | G06F 9/451 |
| | | | | 715/764 |
| 2009/0327960 A1 * | 12/2009 | Dernis | ................... | G06F 3/0482 |
| | | | | 715/823 |
| 2012/0066636 A1 * | 3/2012 | Kaprani | .................... | G06F 9/48 |
| | | | | 715/779 |
| 2017/0208181 A1 * | 7/2017 | Kim | ..................... | H04N 1/0023 |
| 2018/0246624 A1 * | 8/2018 | Barrus | ............... | G06F 16/9577 |
| 2022/0391456 A1 * | 12/2022 | Weskamp | ............ | G06F 3/0485 |

* cited by examiner

*Primary Examiner* — Kc Chen
(74) *Attorney, Agent, or Firm* — Sterne, Kessler, Goldstein & Fox P.L.L.C.

(57) ABSTRACT

A second opened instance of a user interface may be identified based on an indication of a first instance of the user interface. An instance indication element indicating the second opened instance of the user interface may be displayed based on the identified second opened instance of the user interface. An instance indication window may be displayed based on an interaction with the instance indication element. Data fields of the instance indication window may describe the first and second opened instances of the user interface. The instance indication window may include a scrollable element to reveal, according to their opening sequence, additional data fields for additional opened instances of the user interface. Data fields of the instance indication window may be updated/modified to include new descriptions for any opened instance of the user interface. Moreover, the instance indication window includes interactive elements for closing opened instances of the user interface.

17 Claims, 6 Drawing Sheets

Subnets: Configuration Form
*Configure instance details based on your requirements*

| 200A Subnets | 200B Endpoints | 200C Identifiers |

Field Name 1
Field Name 2
Field Name 3
Field Name 4
Field Name 5
Field Name 6
Field Name 7
Field Name 8

Instances Running
- 1 — Identifiers (206A) — 212A
- 2 — Endpoints (206B) — 212B
- 3 — Subnets (206C) — 212C 208A, 208B, 208C, 210, 204

MULTI-INSTANCE USER INTERFACE MANAGEMENT

BACKGROUND

Web applications, user interfaces (UI), and/or the like are used to manage data for specific intents, for example, such as data used to configure network management devices, cloud-based systems (e.g., software as a service (SaaS) systems/components, etc.), private/public networks, and/or the like. Web applications, user interfaces (UI), and/or the like used to configure network management devices, cloud-based systems (e.g., software as a service (SaaS) systems/components, etc.), private/public networks, and/or the like conventionally consist of a large amount of configurations of different types that are configured using multiple instances of the web applications, UIs, and/or the like. Multiple instances of the web applications, UIs, and/or the like are routinely represented and/or presented as multiple tabs, windows, pages, and/or the like. Due to a large amount of configurations associated with specific intents being represented and/or presented as multiple tabs, windows, pages, and/or the like, users using web applications, UIs, and/or the like is difficult (if even possible) to track the multitude of tabs, windows, pages, and/or the like used for specific intents. As a result, users of web applications, UIs, and/or the like routinely become lost and/or confused when trying to identify various instances of the same web application, UI, and/or the like. Confusion and/or uncertainty of which instances of a web application, UI, and/or the like are opened, active, running, and/or being implemented, causes additional tabs, windows, pages, and/or the like to be opened, activated, ran, and/or implemented—resulting in depleted computational resources, system crashes, stalls, and/or errors.

BRIEF DESCRIPTION OF THE DRAWINGS

The following figures use like reference numbers to refer to like elements. Although the following figures depict various example implementations, alternative implementations are within the spirit and scope of the appended claims. In the drawings:

DETAILED DESCRIPTION

Provided herein are system, apparatus, device, method, computer program product embodiments, and/or combinations and sub-combinations thereof, for multi-instance user interface management. A second opened instance of a user interface generated, displayed, and/or navigated to by a user device (e.g., a computer, a smart device, a mobile device, etc.) may be identified based on an indication of a first instance of the user interface. An instance indication element that indicates the second opened instance of the user interface may be displayed based on the identified second opened instance of the user interface. An instance indication window may be displayed, for example, based on an interaction with the instance indication element. A data field of the instance indication window may describe the first opened instance of the user interface, and a second data field of the instance indication window may describe the second opened instance of the user interface.

The system, apparatus, device, method, computer program product embodiments, and/or combinations and sub-combinations thereof for multi-instance user interface management described herein provide an indication of each instance of a user interface that is open, active, running, and/or being implemented. According to some aspects, a data field of an instance indication window that describes an instance of the user interface that is open, active, running, and/or being implemented may be modified, updated, and/or customized to indicate a new description for the instance of the user interface including, but not limited to, a description of the reason that the instance of the user interface was opened, activated, ran, and/or implemented. The system, apparatus, device, method, computer program product embodiments, and/or combinations and sub-combinations thereof for multi-instance user interface management described herein are user interface agnostic and may be implemented for any type, configuration, and/or version of a user interface. The system, apparatus, device, method, computer program product embodiments, and/or combinations and sub-combinations thereof for multi-instance user interface management described herein assist users of a user interface in avoiding confusion and/or uncertainty when attempting to identify various instances of the user interface. The system, apparatus, device, method, computer program product embodiments, and/or combinations and sub-combinations thereof for multi-instance user interface management described herein aid in conserving computational resources routinely expended due to attempts to identify various instances of the user interface, and also may prevent system crashes, stalls, and/or errors. These and other technological advantages are described herein.

Figure 1:
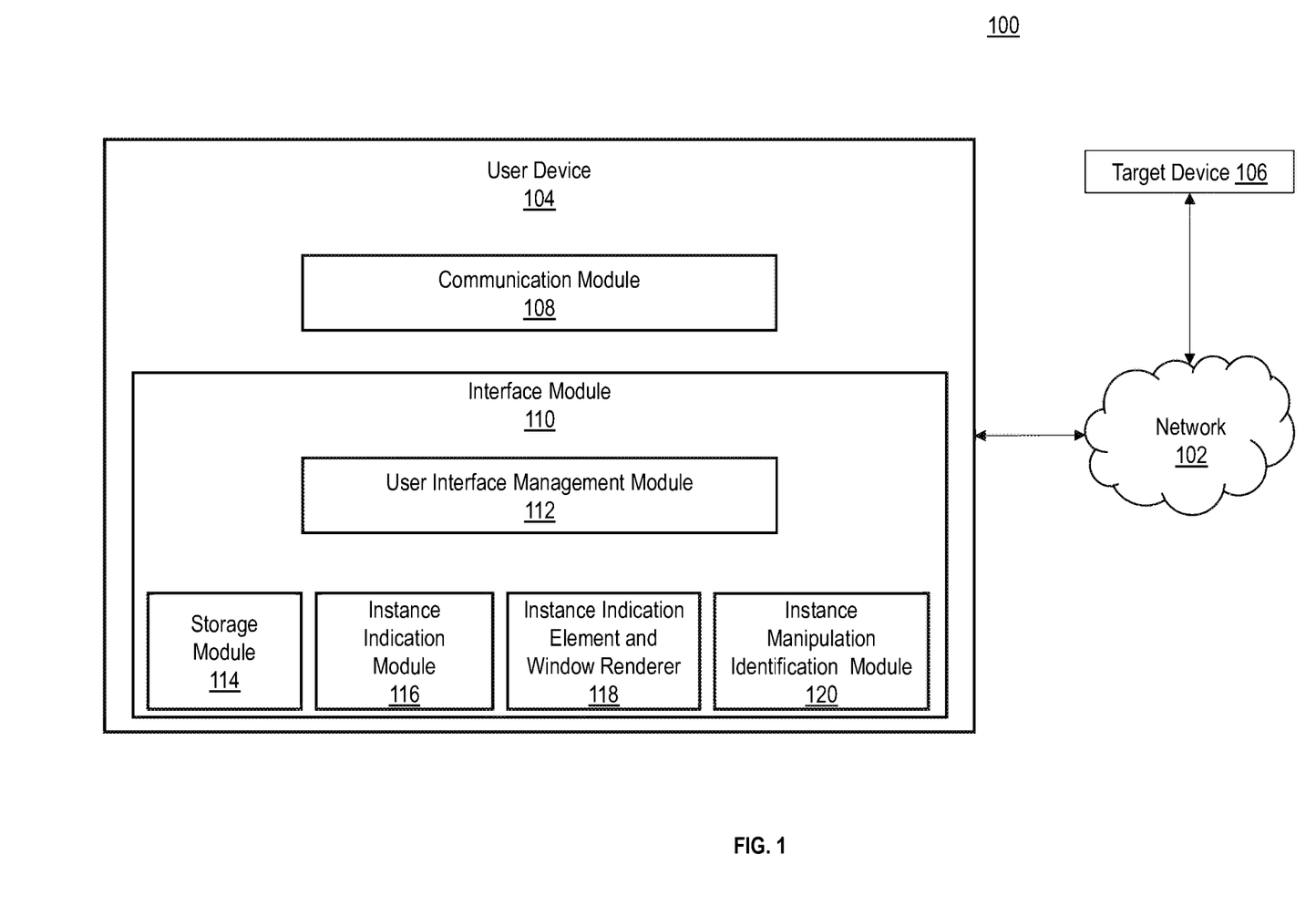
FIG. 1 shows an example system for multi-instance user interface management, according to some aspects.

FIG. 1 shows an example system 100 for multi-instance user interface management. The system 100 is merely an example of one suitable system environment and is not intended to suggest any limitation as to the scope of use or functionality of aspects described herein. Neither should the system 100 be interpreted as having any dependency or requirement related to any single module/component or combination of modules/components described therein.

The system 100 may include a network 102. The network 102 may include a packet-switched network (e.g., internet protocol-based network), a non-packet switched network (e.g., quadrature amplitude modulation-based network), and/or the like. The network 102 may include network adapters, switches, routers, modems, and the like connected through wireless links (e.g., radiofrequency, satellite) and/or physical links (e.g., fiber optic cable, coaxial cable, Ethernet cable, or a combination thereof). The network 102 may include public networks, private networks, wide area networks (e.g., Internet), local area networks, and/or the like. The network 102 may provide and/or support communication from telephone, cellular, modem, and/or other electronic devices to and throughout the system 100. For example, the system 100 may include a user device 104 in communication with a target device 106 via the network 102.

According to some aspects, the user device 104 may include, for example, a smart device, a mobile device, a laptop, a tablet, a display device, a computing device, or any other device capable of communicating with the target device 106. The user device 104 may include a communication module 108 that facilitates and/or enables communication with the network 102 (e.g., devices, components, and/or systems of the network 102, etc.), the target device 106, and/or any other device/component of the system 100. For example, the communication module 108 may include hardware and/or software to facilitate communication. The communication module 108 may comprise one or more of a modem, transceiver (e.g., wireless transceiver, etc.), digital-to-analog converter, analog-to-digital converter, encoder, decoder, modulator, demodulator, tuner (e.g., QAM tuner, QPSK tuner), and/or the like. The communication module 108 may include any hardware and/or software necessary to facilitate communication.

According to some aspects, the user device 104 may include an interface module 110. The interface module 110 enables a user to interact with the user device 104, the network 102, the target device 106, and/or any other device/component of the system 100. The interface module 110 may include any interface for presenting and/or receiving information to/from a user.

The target device 106 may include a computing device, a network device, a cloud-based device/component, an Internet-of-Things (IoT) device, a smart device, a system device, and/or any other type of device and/or system component. According to some aspects, the target device 106 may be any device, network, and/or system that may be configured by the user device 104, for example, via a user interface management module 112.

According to some aspects, the interface module 110 may include the user interface management module 112. The user interface management module 112 enables a user to view web application documentation and/or content, application pages, webpages, and/or any instance of a user interface (e.g., a multi-instance user interface, etc.). For example, the user interface management module 112 may be used to access and/or view instances and/or the like of an application configured with, and/or accessible by the user device 104. The user interface management module 112 may be used to access various data fields presented on various instances, views, screens, pages, forms, and/or the like of a user interface (e.g., the interface module, etc.) generated by, configured with, and/or accessible by the user device 104.

According to some aspects, the user interface management module 112 may include a web browser (e.g., Internet Explorer®, Mozilla Firefox®, Google Chrome®, Safari®, or the like). The user interface management module 112 may request/query and/or send/provide various files from a local source and/or a remote source, such as the target device 106, and/or the like. The user interface management module 112 may access, process, and view information, web forms, web pages, and/or applications available within the system 100 via the network 102.

According to some aspects, the interface module 110 may include one or more input devices, components, and/or elements, for example, such as a keyboard, a pointing device (e.g., a computer mouse, remote control), a microphone, a joystick, a tactile input device (e.g., touch screen, gloves, etc.), and/or the like. According to some aspects, interaction with the input devices and/or components may enable a user to view, access, request, and/or navigate a user interface generated and/or displayed by the interface module 110 and/or accessible via the user interface management module 112. According to some aspects, interaction with the input devices and/or components may enable a user to manipulate and/or interact with components of a user interface, for example, data fields, interactive elements, windows (e.g., instance indication windows, pop-up windows, instance indication elements, etc.), and/or the like.

According to some aspects, the interface module 110 may include and/or be in communication with a storage module 114. According to some aspects, the storage module 114 may include a local document database (e.g., window.localStorage, etc.) and/or the like used to store indications of instances of a user interface including, but not limited to, indications of instances of a web application and/or the like used to configure the target device 106 (and/or any other user interface) are opened, activated, ran, implemented, closed, terminated, ended, shutdown, and/or the like. The storage module 114 may support an open standard file and data interchange format including, but not limited to JavaScript Object Notation (JSON) and/or the like, that uses human-readable text to store and transmit data objects consisting of key-value pairs and arrays. The storage module 114 may store data indicative of whenever an instance of a user interface is opened, activated, ran, implemented, closed, terminated, ended, shutdown, and/or the like.

According to some aspects, EXAMPLE FORMAT 1 below shows an example format of a local storage object for storing indications of user interface instances. The system, apparatus, device, method, computer program product embodiments, and/or combinations and sub-combinations thereof, for multi-instance user interface management, are not limited to EXAMPLE FORMAT 1, and other formats and/or the like may be used in accordance with aspects described herein.

EXAMPLE FORMAT 1

```
window.localStorage.UserInterfaceInstances = {
    <date-time-instance-opened>: {
        customTitle: Example 2
        orginalTitle: Example 1
        status: OPEN (or CLOSE)
    },
    ...
    ...
    <date-time-instance-opened>: {
        ...
        ...
    }
}
```

According to some aspects, as used in EXAMPLE FORMAT 1, the key in the object UserInterfaceInstances is the <date-time-instance-opened>, which indicates the date and time an instance of a user interface is opened, activated, ran, and/or implemented. According to some aspects, the "originalTitle" value indicates the original title and/or description of the instance of the user interface. According to some aspects, the "customTitle" value indicates a custom and/or new title and/or description for the instance of the user interface. For example, the interface module 110 (e.g, a keyboard, a mouse, a tactile device, a haptic feedback device/component, a touchscreen, a biometric input component, etc.) may modify data (e.g., "Example 2") indicated for the "customTitle" value according to user input and/or interaction. According to some aspects, interaction with the interface module 110 may be used to create a custom and/or new title and/or description for any instance of the user interface.

According to some aspects, for example, in a situation/scenario when an instance of a user interface is closed, terminated, ended, shutdown, and/or the like, the key in the object UserInterfaceInstances may be modified to indicate <date-time-instance-closed>, and the "status" value may be modified to indicate: CLOSE. According to some aspects, a call, command, and/or instruction, for example, such as window.close( ) may be used to close a specific instance of a user interface. For example, according to some aspects, window.close( ) may be used to close a specific instance of a user interface, whenever a user wants to explicitly close the instance of a user interface using a close button (or equivalent) in the the instance indication window 204 (e.g., instance manipulation elements 212A-212C, etc.).

According to some aspects, the interface module 110 may include an instance identification module 116. The instance identification module 116 may detect and/or identify whenever an instance of a user interface is opened, activated, ran, and/or implemented. According to some aspects, the instance identification module 116 may perform session identifier tracking, client identifier tracking, and/or any other technique to detect and/or identify whenever an instance of a user interface is opened, activated, ran, and/or implemented.

According to some aspects, the instance identification module 116 may include and/or encode event listeners that listen and/or monitor events associated with a user interface. For example, encode event listeners that listen and/or monitor events such as whenever an instance of a user interface is opened, activated, ran, implemented, closed, terminated, ended, shutdown, and/or the like. According to some aspects, the instance identification module 116, for example, via event listeners, may inform, access, and/or communicate with components of (and/or in communication with) the interface module 110, such as the storage module 114 and/or the like, whenever an instance of a user interface is opened, activated, ran, and/or implemented.

According to some aspects, the instance identification module 116 (e.g., via event listeners, etc.), may monitor and/or periodically determine from a local storage object (e.g., EXAMPLE FORMAT 1, etc.) any changes (e.g., opening, closing, etc.) associated with user interface instances. For example, the instance identification module 116 may monitor and/or periodically (e.g., every three seconds, etc.) determine from a local storage object stored by the storage module 114 any changes associated with user interface instances according to a function (e.g., setInterval( ) function, etc.) and/or the like. According to some aspects, any time interval may be used for the function. According to some aspects, EXAMPLE FUNCTION 1 below shows an example function that may be used to periodically determine from a local storage object stored by the storage module 114 any changes associated with user interface instances. The system, apparatus, device, method, computer program product embodiments, and/or combinations and sub-combinations thereof, for multi-instance user interface management, are not limited to EXAMPLE FUNCTION 1, and other functions and/or the like may be used in accordance with aspects described herein.

| EXAMPLE FUNCTION 1 |
|---|
| setInterval(<br>    function ( ) {// example logic to monitor changes in user interface instances},<br>    <3 seconds><br>); |

According to some aspects, the interface module 110 may include an instance indication element and window renderer (IIEWR) module 118. The IIEWR module 118 may generate, render, and/or present an instance indication element that indicates instances of a user interface that are opened, activated, ran, and/or implemented.

According to some aspects, the IIEWR module 118 may generate, render, and/or present an instance indication element that indicates instances of a user interface that are opened, activated, ran, and/or implemented using a dynamic, lightweight, interpreted, and/or just-in-time compiled programming language with first-class function that may be implemented via a pluggable application and/or the like. For example, the IIEWR module 118 may generate, render, and/or present an instance indication element that indicates instances of a user interface that are opened, activated, ran, and/or implemented by using a just-in-time compiled programming language such as JavaScript, Typescript, Dart, ClojureScript, Ruby, Python, and/or the like. For example, JavaScript with dynamic generation of a Document Object Model (DOM) and Cascading Style Sheets (CSS) may be used to generate, render, and/or cause the display of an instance indication element. The user device 104 may use and/or implement any programming language to generate, render, and/or cause the display of an instance indication element.

According to some aspects, the interface module 110 may include an instance manipulation identification module 120. Though shown as separate modules, according to some aspects, the IIEWR module 118 and the instance manipulation identification module 120 may be part of a single module. According to some aspects, the instance manipulation identification module 120 may include and/or encode event listeners that listen for and/or monitor events associated with a user interface, such as whenever an instance of a user interface is opened, activated, ran, and/or implemented.

According to some aspects, the instance manipulation identification module 120 may inform, notify, and/or communicate with the storage module 114 to update data/information indicative of instances of a user interface. For example, the instance manipulation identification module 120 may inform, notify, and/or communicate with the storage module 114 to update the window.localStorage.UserInterfacesInstances object of EXAMPLE FORMAT 1 whenever a new instance of the user interface is loaded (e.g., opened, activated, ran, implemented, etc.) using a "load" event configuration, trigger, indicator, and/or the like.

According to some aspects, EXAMPLE EVENT 1 below shows an example "load" event configuration, trigger, indicator, and/or the like. The system, apparatus, device, method, computer program product embodiments, and/or combinations and sub-combinations thereof, for multi-instance user interface management, are not limited to EXAMPLE EVENT 1, and other event configurations, triggers, indicators, and/or like may be used in accordance with aspects described herein.

Example Event 1 object.addEventListener("load", myScript)

Figure 2A:
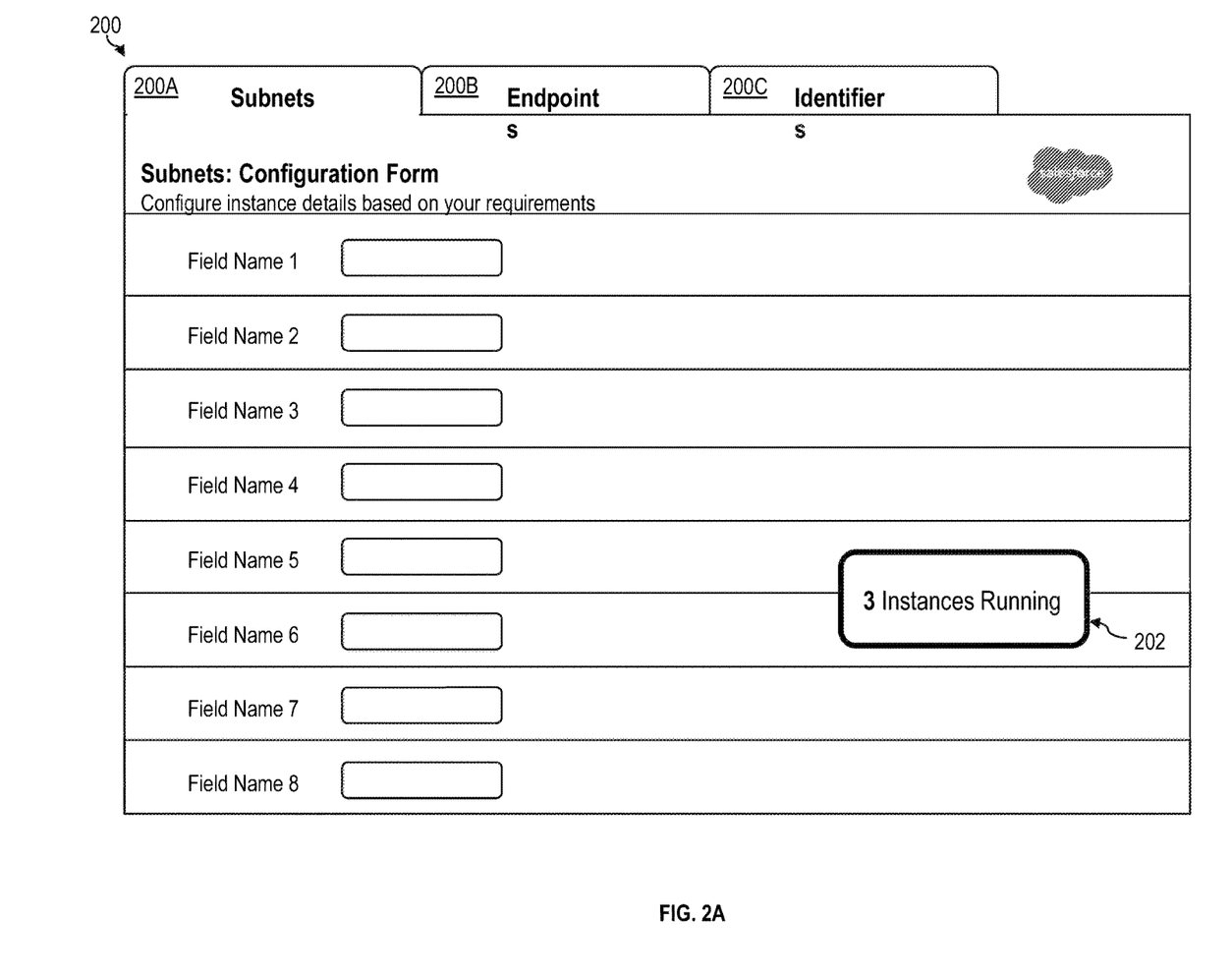
FIG. 2A shows an example of a user interface displaying an instance indication element for multi-instance user interface management, according to some aspects.
Figure 2B:
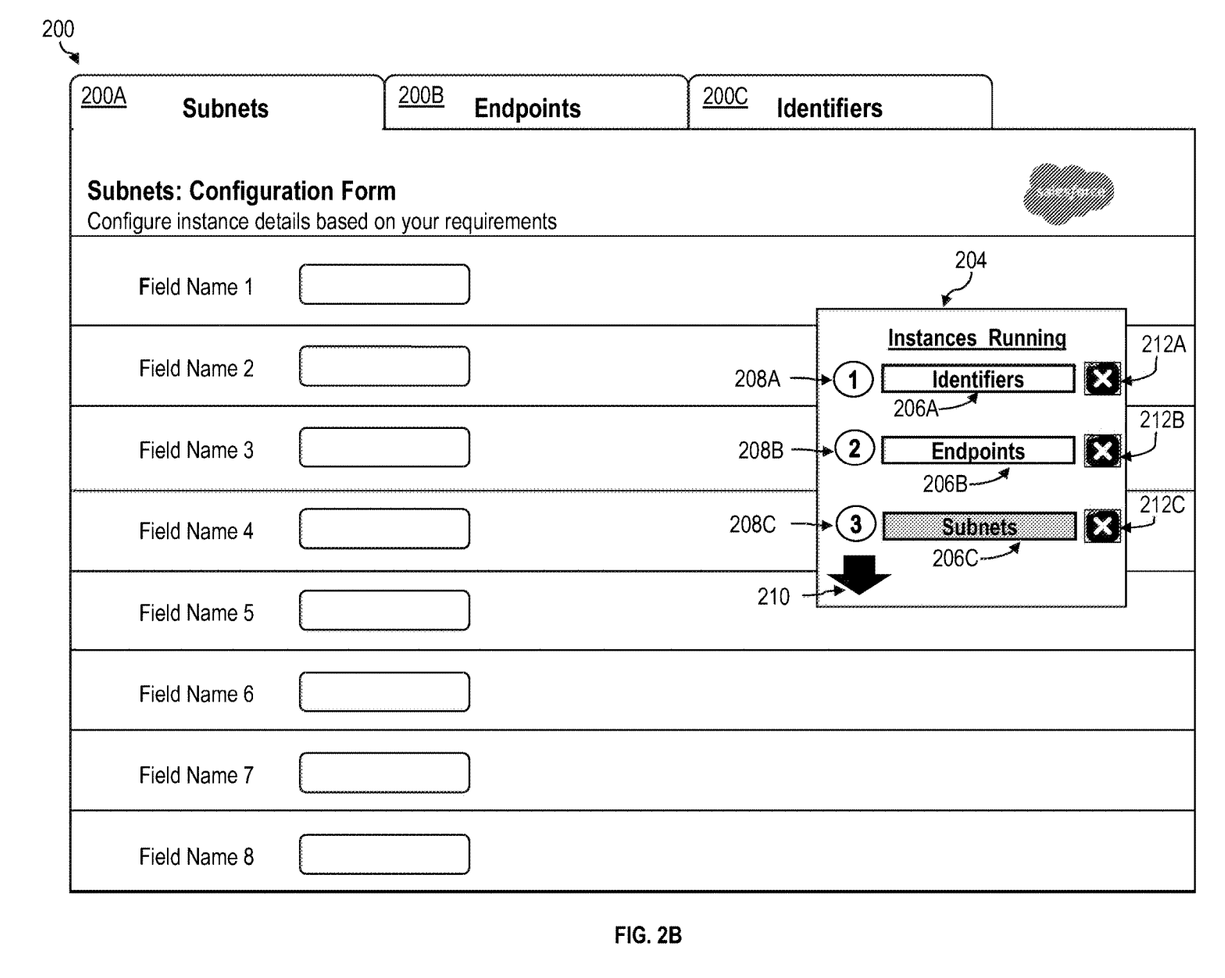
FIG. 2B shows an example of a user interface displaying an instance indication window for multi-instance user interface management, according to some aspects.

FIG. 2A shows an example of a user interface 200 generated, accessed, and/or displayed by the interface module 110. User interface instances 200A-200C are instances of the user interface 200 that have been opened, activated, ran, and/or implemented. According to some aspects, the user interface instances 200A-200C may be used to configure various aspects, configurations, settings, parameters, components, and/or the like of the target device 106 and/or the like.

As shown in FIG. 2A, the user interface instance 200A is a currently displayed instance of the user interface 200. According to some aspects, the IIEWR module 118 generates, renders, and/or presents an instance indication element 202 that indicates instances of the user interface 200. According to some aspects, the instance indication element 202 may indicate an amount of instances of the user interface 200 that are opened, activated, ran, and/or implemented. For example, as shown in FIG. 2A, the instance indication element 202 indicates that three instances of the user interface 200 are running.

Returning to FIG. 1, according to some aspects, the IIEWR module 118 may generate, render, and/or present an instance indication window that includes data fields that describe instances of a user interface that are opened, activated, ran, and/or implemented.

According to some aspects, the IIEWR module 118 may generate, render, and/or present an instance indication window that includes data fields that describe instances of a user interface that are opened, activated, ran, and/or implemented using a dynamic, lightweight, interpreted, and/or just-in-time compiled programming language with first-class function that may be implemented via a pluggable application and/or the like. For example, the IIEWR module 118 may generate, render, and/or present an instance indication window that includes data fields that describe instances of a user interface that are opened, activated, ran, and/or implemented by using a just-in-time compiled programming language such as JavaScript, Typescript, Dart, ClojureScript, Ruby, Python, and/or the like. For example, JavaScript with dynamic generation of a Document Object Model (DOM) and Cascading Style Sheets (CSS) may be used to generate, render, and/or cause the display of an instance indication window. The user device 104 may use and/or implement any programming language to generate, render, and/or cause the display of an instance indication window.

According to some aspects, the IIEWR module 118 may generate, render, and/or present an instance indication window that includes data fields that describe instances of a user interface that are opened, activated, ran, and/or implemented responsive to an interaction with an instance indication element. According to some aspects, data fields of an instance indication window may be ordered according to the sequence in which instances of a user interface described by the data fields are opened, activated, ran, and/or implemented.

According to some aspects, a sequence in which instances of a user interface described by the data fields are opened, activated, ran, and/or implemented may correspond to the order and/or sequence in which key-value pairs indicative of instances of a user interface that have been opened, activated, ran, and/or implemented are added to the "window.localStorage.UserInterfaceInstances" object of EXAMPLE FORMAT 1.

According to some aspects, the order in which a key-value pair indicative of an opened (and/or closed) instance of a user interface is added to the "window.localStorage.UserInterfaceInstances" object of EXAMPLE FORMAT 1 may be used to identify, detect, and/or determine an ordering and/or sequencing information used when the IIEWR module 118 generates, renders, and/or presents an instance indication window that includes data fields that describe instances of the user interface that are opened, activated, ran, and/or implemented.

According to some aspects, the storage module 114 may store a variable for each instance of a user interface in a format including, but not limited to, a JavaScript context and/or the like. For example, the storage module 114 may store a variable for each instance of a user interface in a JavaScript context named currentUserInterfaceInstanceId=<date-time-instance-opened>. According to some aspects, the IIEWR module 118 may use the stored variable for an instance of a user interface whenever the instance of the user interface is closed, terminated, ended, shutdown, and/or the like to identify the key-value pair in the storage module 114 (e.g., window.localStorage, etc.). According to some aspects, the IIEWR module 118 may use the stored variable for an instance of a user interface to modify an attribute (e.g., a color, a shape, a font of data, etc.) of the associated data field of an instance indication window that describes the instance of a user interface based on an indication that instance is being displayed and/or the like.

FIG. 2B shows an example of a user interface 200 generated, accessed, and/or displayed by the interface module 110. As shown in FIG. 2B, an instance indication window 204 is displayed. According to some aspects, the instance indication window 204 is displayed responsive to an interaction with the indication element 202 of FIG. 2A. According to some aspects, the instance indication window 204 includes data fields 206A-206C that describe the user interface instances 200A-200C that are opened, activated, ran, and/or implemented.

According to some aspects, the instance indication window 204 includes sequencing elements 208A-208C that indicate a sequence in which user interface instances 200A-200C are opened, activated, ran, and/or implemented. According to some aspects, since the order and/or sequence of the sequencing elements 208A-208C is based on a key-value pair order in the "window.localStorage.UserInterfaceInstances" object of EXAMPLE FORMAT 1, the order and/or sequence of the sequencing elements 208A-208C may be adjusted (e.g., automatically, etc.) whenever the instance indication window 204 is generated, accessed, and/or displayed.

According to some aspects, the IIEWR module 118 may generate, render, and/or present a scrollable element 210 for the instance indication window 204. For example, the IIEWR module 118 may generate the scrollable element 210 based on the amount of data fields (e.g., the data fields 206A-206C, etc.) of the instance indication window 204 exceeding field display thresholds for the instance indication window 204. The scrollable element 210 may include, for example, a scroll bar, a directional arrow(s), a graphical indicator, and/or the like. The IIEWR module 118 causes additional data fields and/or overflow fields (e.g., fields that do not fix within a viewable area, etc.) to be displayed within the instance indication window 204 based on an interaction with the scrollable element 210.

According to some aspects, as shown in FIG. 2B, the user interface instance 200A is a currently displayed instance of the user interface 200. An attribute of the data field 206C that corresponds to the user interface instance 200A has been modified to indicate that the user interface instance 200A is a currently displayed instance of the user interface 200. For example, the color of the data field 206C is different from the color of the data fields 206A-206B to indicate that the user interface instance 200A is a currently displayed instance of the user interface 200. Any attribute of a data field may be modified to indicate that a user interface instance is a currently displayed instance of a user interface.

According to some aspects, the instance manipulation identification module 120 may generate, render, and/or present instance manipulation elements 212A-212C within the instance manipulation identification module 120. The instance manipulation elements 212A-212C may correspond and/or be associated with the data fields 206A-206C. According to some aspects, interaction with the instance manipulation element 212A causes the user interface instance 200A associated with the data field 206A to close (and/or be a currently displayed instance of the user interface 200). According to some aspects, interaction with the instance manipulation element 212B causes the user interface instance 200B associated with the data field 206B to close (and/or be a currently displayed instance of the user interface 200). According to some aspects, interaction with the instance manipulation element 212C causes the user interface instance 200C associated with the data field 206C to close (and/or be a currently displayed instance of the user interface 200).

According to some aspects, the instance manipulation identification module 120 may track, detect, determine, and/or identify whenever an instance of a user interface is closed, terminated, ended, shutdown, and/or the like. The instance manipulation identification module 120 may include and/or encode event listeners that listen for and/or monitor events associated with a user interface, such as whenever an instance of a user interface is closed, terminated, ended, shutdown, and/or the like.

According to some aspects, the instance manipulation identification module 120 may track, detect, determine, and/or identify whenever an instance of a user interface is closed, terminated, ended, shutdown, and/or the like by using a "beforeunload" event configuration, trigger, indicator, and/or the like. According to some aspects, EXAMPLE EVENT 2 below shows an example "beforeunload" event configuration, trigger, indicator, and/or the like. The system, apparatus, device, method, computer program product embodiments, and/or combinations and sub-combinations thereof, for multi-instance user interface management, are not limited to EXAMPLE EVENT 2, and other event configurations, triggers, indicators, and/or like may be used in accordance with aspects described herein.

EXAMPLE EVENT 2

```
window.addEventListener("beforeunload", function (e) {
})
```

Figure 3:
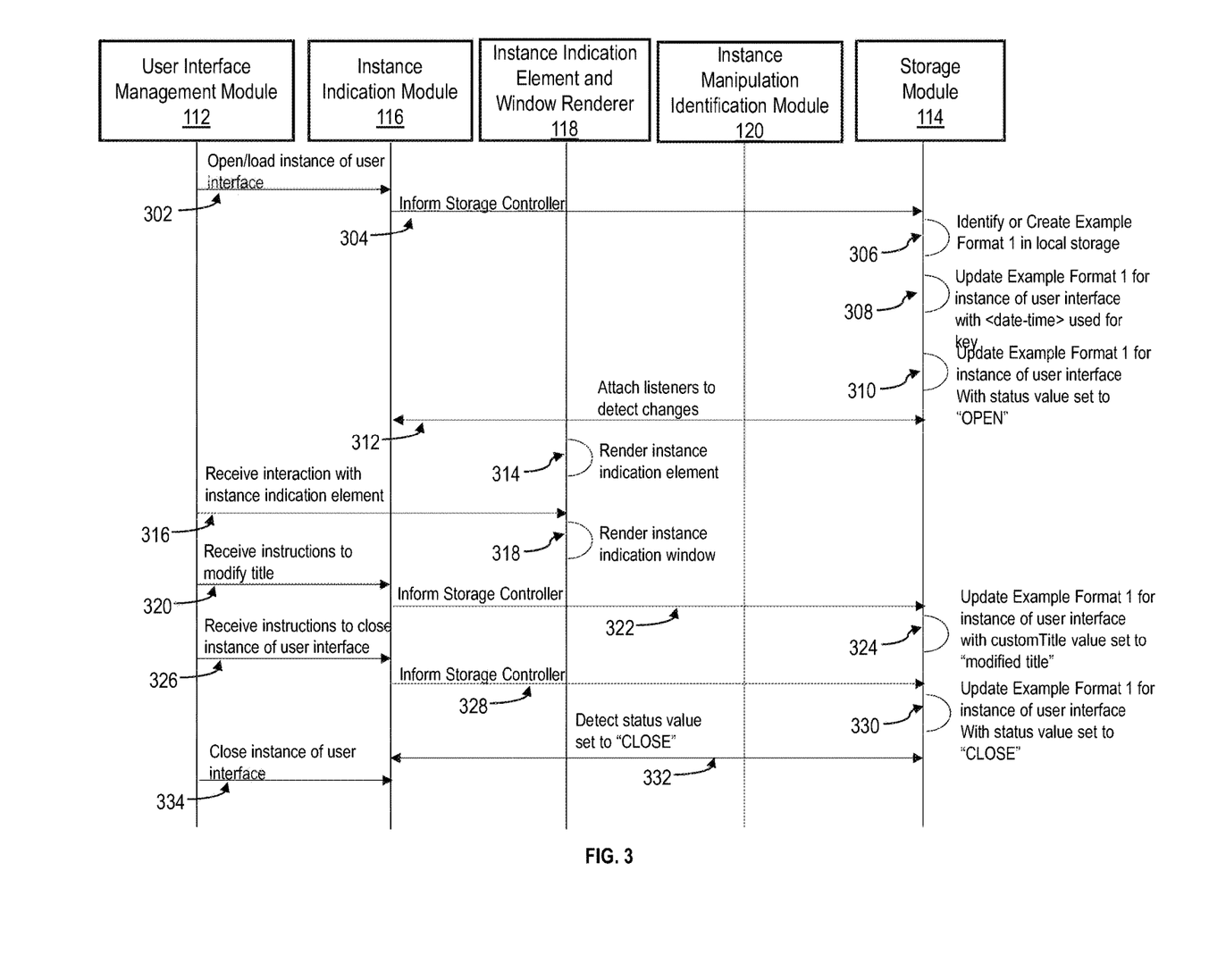
FIG. 3 shows an example communication diagram for multi-instance user interface management, according to some aspects.

According to some aspects, FIG. 3 shows an example communication diagram 300 for multi-instance user interface management. The communication diagram 300 depicts communications between and/or actions performed by components of the user device 104 of FIG. 1, such as the user interface management module 112, the storage module 114, the instance identification module 116, the IIEWR module 118, and the instance manipulation identification module 120. The communications between and/or actions performed by components of the user device 104 enable multi-instance user interface management.

In 302, the user interface management module 112 is used to launch (e.g., open, activate, run, implement, etc.) an instance of a user interface. The instance of the user interface may be, for example, an instance of a complex form used to configure a target device and/or the like.

In 304, the instance identification module 116 detects, determines, and/or identifies the launch of the instance of the user interface and informs and/or communicates with the storage module 114. The instance identification module 116 uses (e.g., attaches, associates, encodes, etc.) event listeners that monitor events of a user interface. The event listeners detect, determine, and/or identify the launch of the instance of the user interface and inform, access, and/or communicate with the storage module 114.

In 306, the storage module 114 determines whether an indication of the instance of the user interface exists in local storage. For example, the storage module 114 determines whether window.localStorage.UserInterfacesInstances object of EXAMPLE FORMAT 1 exists in local storage. If the window.localStorage.UserInterfacesInstances object does not exist in local storage, it may be created.

In 308, the storage module 114 updates/modifies the indication of the instance of the user interface with time-stamp information. For example, the storage module 114 updates/modifies the window.localStorage.UserInterfacesInstances object of EXAMPLE FORMAT 1 with <date-time> used for its key. The "date-time" corresponds to the date and time that the launch of the instance of the user interface occurs.

In 310, the storage module 114 updates/modifies the indication of the instance of the user interface with status information. For example, the storage module 114 updates/modifies the window.localStorage.UserInterfacesInstances object of EXAMPLE FORMAT 1 with its status value set to "Open."

In 312, the instance identification module 116 uses attached event listeners to detect the indication of the instance of the user interface stored by the storage module 114. The instance identification module 116 may monitor and/or periodically (e.g., every three seconds, etc.) determine from a local storage object stored by the storage module 114 any changes associated with user interface instances according to a function (e.g., setInterval( ) function, etc.) and/or the like. The function may be used to detect the indication of the instance of the user interface.

In 314, the IIEWR module 118 generates, renders, and/or presents an instance indication element that indicates the launched instance of a user interface and any other launched instances of the user interface.

In 316, the user interface management module 112 receives an interaction with the instance indication element. For example, an input component (e.g., a keyboard, a mouse, a touchscreen, etc.) of a user device is used to click a number displayed by the instance indication element indicative of launched instances of the user interface.

In 318, the IIEWR module 118 generates, renders, and/or presents an instance indication window that includes data fields that describe launched instances of the user interface.

In 320, the user interface management module 112 receives an instruction to modify a title of a launched instance of the user interface. For example, an input component (e.g., a keyboard, a mouse, a touchscreen, etc.) of a user device is used to send/input an instruction to modify a title of a launched instance of the user interface.

In 322, the instance identification module 116 detects, determines, and/or identifies the instruction to modify a title of a launched instance of the user interface and informs and/or communicates with the storage module 114. For example, the attached/encoded event listeners detect, determine, and/or identify the received instruction to modify the title of a launched instance of the user interface and/or communicate the instruction to the storage module 114.

In 324, the storage module 114 updates/modifies the indication of the instance of the user interface with a custom title and/or description for the launched instance of the user interface. For example, the storage module 114 updates/modifies the window.localStorage.UserInterfacesInstances object of EXAMPLE FORMAT 1 with its customTitle value set to any title and/or description received with the instruction to modify the title of the launched instance of the user interface.

In 326, the user interface management module 112 receives an instruction to close a launched instance of the user interface. For example, an input component (e.g., a keyboard, a mouse, a touchscreen, etc.) of a user device is used to send/input an instruction to close a launched instance of the user interface.

In 328, the instance identification module 116 detects, determines, and/or identifies the instruction to close the launched instance of the user interface and informs and/or communicates with the storage module 114. For example, the attached/encoded event listeners detect, determine, and/or identify the received instruction to modify the title of a launched instance of the user interface and/or communicate the instruction to the storage module 114.

In 330, the storage module 114 updates/modifies the indication of the instance of the user interface with status information. For example, the storage module 114 updates/modifies the window.localStorage.UserInterfacesInstances object of EXAMPLE FORMAT 1 with its status value set to "Close."

In 332, the instance identification module 116 uses attached event listeners to detect the status value for the indication of the instance of the user interface is set to "Close." The instance identification module 116 may monitor and/or periodically (e.g., every three seconds, etc.) determine from the local storage object stored by the storage module 114 has a status value for the indication of the instance of the user interface set to "Close."

In 326, the user interface management module 112 closes the launched instance of the user interface.

Figure 4:
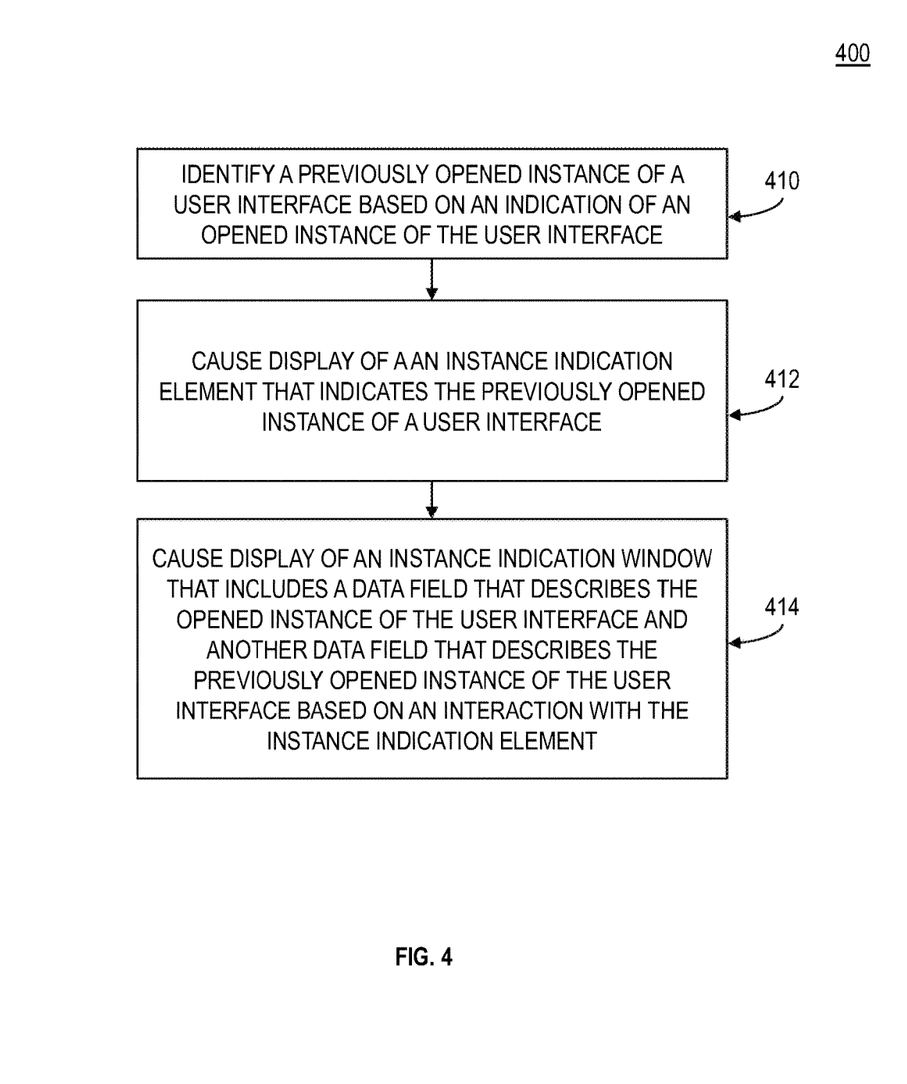
FIG. 4 shows a flowchart of an example method for multi-instance user interface management, according to some aspects.

FIG. 4 shows a flowchart of an example method 400 for multi-instance user interface management, according to some aspects. Method 400 can be performed by processing logic that can comprise hardware (e.g., circuitry, dedicated logic, programmable logic, microcode, etc.), software (e.g., instructions executing on a processing device), or a combination thereof. It is to be appreciated that not all steps may be needed to perform the disclosure provided herein. Further, some of the steps may be performed simultaneously, or in a different order than shown in FIG. 4, as will be understood by a person of ordinary skill in the art. Method 400 shall be described with reference to FIGS. 1-3. However, method 400 is not limited to the aspects of those figures.

In 410, user device 104 identifies a second opened instance of a user interface based at least in part on an indication of a first instance of the user interface. According to some aspects, user device 104 may identify any opened instance of the user interface. For example, the user device 104 may generate, launch, and/or cause to be displayed, multiple instances of the user interface. The user interface may be, for example, a complex form used to configure a target device and/or the like. The user interface may be any type of user interface including, but not limited to, a web form, a configuration screen, and/or the like. Different instances of the user interface may be opened and used to configure different intents, aspects, components, and/or the like for the target device and/or the like.

According to some aspects, user device 104 identifies the second opened instance of the user interface by identifying a key-value pair indicative of the second opened instance in local storage for the user interface. The local storage may include a local document-object model storage, persistent storage, web storage, and/or the like.

In 412, user device 104 causes display of an instance indication element that indicates the second opened instance of the user interface. According to some aspects, user device 104 may cause the display of the instance indication element that indicates the second opened instance of the user interface based at least in part on identifying the second opened instance of the user interface.

In 414, user device 104 causes display of an instance indication window. According to some aspects, user device 104 may cause the display of the instance indication window based on an interaction with the instance indication element. According to some aspects, a data field of the instance indication window may describe the first opened instance of the user interface and second data field of the instance indication window may describe the second opened instance of the user interface.

According to some aspects, the first data field of the instance indication window and the second data field of the instance indication window are each associated with a respective sequencing element that indicates an instance opening sequence for the first opened instance of the user interface and the second opened instance of the user interface.

According to some aspects, the first data field of the instance indication window and the second data field of the instance indication window are each associated with a respective instance manipulation element. According to some aspects, an interaction with the respective instance manipulation element for the first data field causes the first opened instance of the user interface to at least one of: close or be a currently displayed instance of the user interface. According to some aspects, an interaction with the respective instance manipulation element for the second data field causes the second opened instance of the user interface to at least one of close or be the currently displayed instance of the user interface.

According to some aspects, the method 400 may include the user device 104 storing a key-value pair indicative of the first opened instance of the user interface in a local storage for the user interface. The the user device 104 may modify the instance indication window to indicate the first data field of the instance indication window that describes the first opened instance of the user interface based on the stored key-value pair indicative of the first opened instance.

According to some aspects, the method 400 may further include the user device 104 modifying an attribute of the first data field of the instance indication window that describes the first opened instance. According to some aspects, the user device 104 may modify an attribute of the first data field of the instance indication window that describes the first opened instance based on an indication that the first opened instance of the user interface is a currently displayed instance of the user interface. According to some aspects, the modified attribute may include a color of the first data field, a shape of the first data field, a font of data in the first data field, and/or the like.

According to some aspects, the method 400 may further include the user device 104 modifying the first data field of the instance indication window to include a new description for the first opened instance of the user interface. The user device 104 may modify the first data field of the instance indication window to include a new description for the first opened instance of the user interface based on instructions received via an input component of a user device. The interactive element of the user device may include, for example, a keyboard, a mouse, a tactile device, a haptic feedback device/component, a touchscreen, a biometric input component, and/or the like.

According to some aspects, the method 400 may further include the user device 104 generating a scrollable element for the instance indication window. For example, the user device 104 may generate the scrollable element for the instance indication window based on fields of additional fields of the instance indication window exceeding a field display threshold for the instance indication window. The scrollable element may include, for example, a scroll bar, a directional arrow(s), a graphical indicator, and/or the like. The user device 104 may cause at least a portion of the fields of the additional fields to be displayed within the instance indication window. For example, the user device 104 may cause at least a portion of the fields of the additional fields to be displayed within the instance indication window based on an interaction with the scrollable element.

According to some aspects, the method 400 may further include the user device 104 sending configuration information to a target device. For example, the user device 104 may send configuration information to a target device based at least in part on change to the data in the first data field. For example, once the change to the data in the first data field is made, data/information (e.g., configuration information, etc.) indicative of the change may be submitted and/or sent for processing. The submission and processing may include sending the configuration information to the target device.

Figure 5:
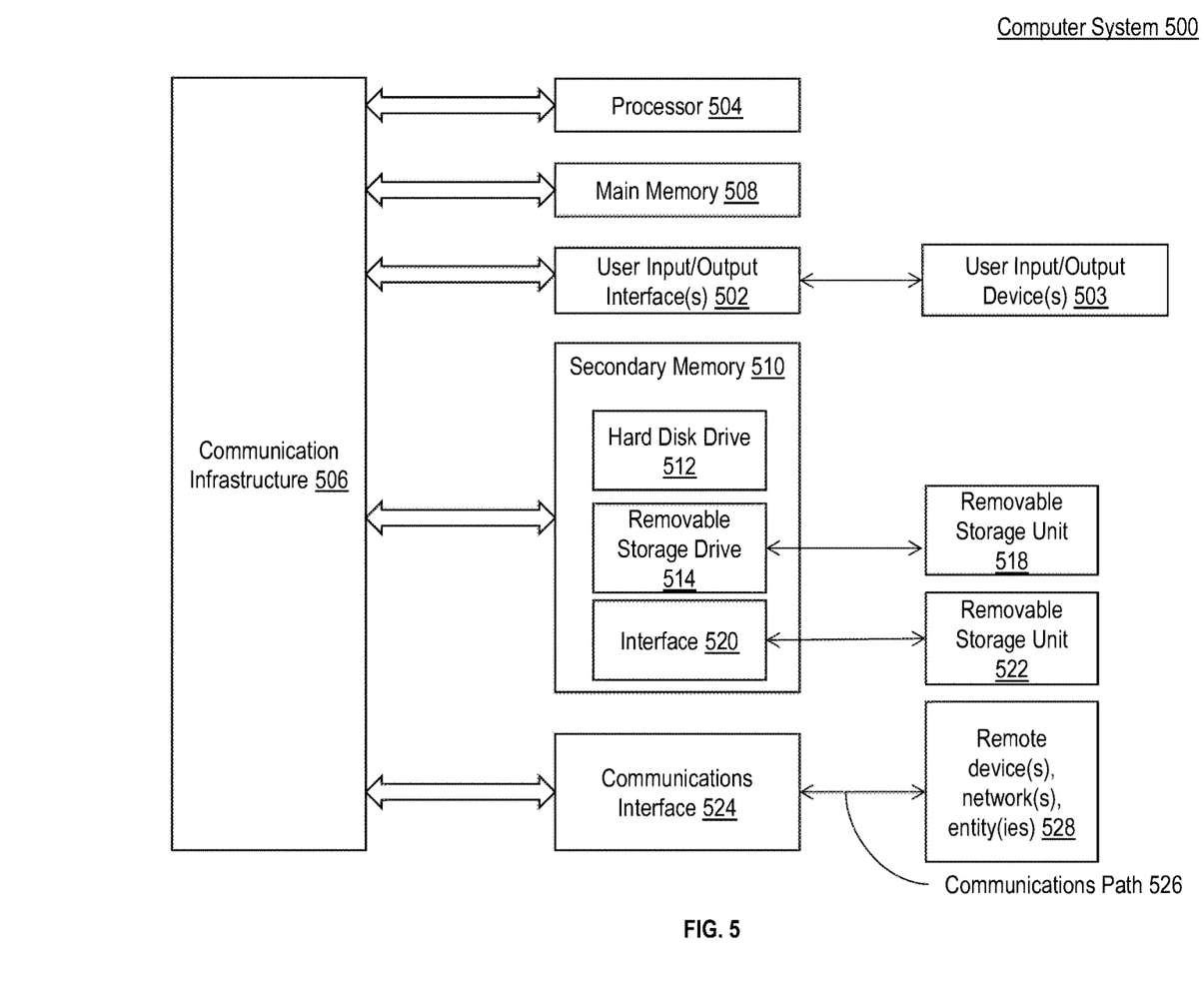
FIG. 5 shows a schematic block diagram of an example computer system in which aspects described may be implemented.

FIG. 5 is an example computer system useful for implementing various embodiments. Various embodiments may be implemented, for example, using one or more well-known computer systems, such as computer system 500 shown in FIG. 5. One or more computer systems 500 may be used, for example, to implement any of the embodiments discussed herein, as well as combinations and sub-combinations thereof. According to some aspects, the user device 104 of FIG. 1 (and/or any other device/component described herein) may be implemented using the computer system 500. According to some aspects, the computer system 500 may be used to implement method 400 and/or any other methods and/or steps described herein.

Computer system 500 may include one or more processors (also called central processing units, or CPUs), such as a processor 504. Processor 504 may be connected to a communication infrastructure or bus 506.

Computer system 500 may also include user input/output device(s) 502, such as monitors, keyboards, pointing devices, etc., which may communicate with communication infrastructure or bus 506 through user input/output device(s) 502.

One or more of processors 504 may be a graphics processing unit (GPU). In an embodiment, a GPU may be a processor that is a specialized electronic circuit designed to process mathematically intensive applications. The GPU may have a parallel structure that is efficient for parallel processing of large blocks of data, such as mathematically intensive data common to computer graphics applications, images, videos, etc.

Computer system 500 may also include a main or primary memory 508, such as random access memory (RAM). Main memory 508 may include one or more levels of cache. Main memory 508 may have stored therein control logic (i.e., computer software) and/or data.

Computer system 500 may also include one or more secondary storage devices or memory 510. Secondary memory 510 may include, for example, a hard disk drive 512 and/or a removable storage device or drive 514. Removable storage drive 514 may be a floppy disk drive, a magnetic tape drive, a compact disk drive, an optical storage device, a tape backup device, and/or any other storage device/drive.

Removable storage drive 514 may interact with a removable storage unit 518. The removable storage unit 518 may include a computer-usable or readable storage device having stored thereon computer software (control logic) and/or data. Removable storage unit 518 may be a floppy disk, magnetic tape, compact disk, DVD, optical storage disk, and/any other computer data storage device. Removable storage drive 514 may read from and/or write to the removable storage unit 518.

Secondary memory 510 may include other means, devices, components, instrumentalities, and/or other approaches for allowing computer programs and/or other instructions and/or data to be accessed by computer system 500. Such means, devices, components, instrumentalities, and/or other approaches may include, for example, a removable storage unit 522 and an interface 520. Examples of the removable storage unit 522 and the interface 520 may include a program cartridge and cartridge interface (such as that found in video game devices), a removable memory chip (such as an EPROM or PROM) and associated socket, a memory stick and USB port, a memory card and associated memory card slot, and/or any other removable storage unit and associated interface.

Computer system 500 may further include a communication or network interface 524. Communication interface 524 may enable computer system 500 to communicate and interact with any combination of external devices, external networks, external entities, etc. (individually and collectively referenced by reference number 528). For example, communication interface 524 may allow computer system 500 to communicate with external or remote devices 528 over communications path 526, which may be wired and/or wireless (or a combination thereof), and which may include any combination of LANs, WANs, the Internet, etc. Control logic and/or data may be transmitted to and from computer system 500 via communication path 526.

Computer system 500 may also be any of a personal digital assistant (PDA), desktop workstation, laptop or notebook computer, netbook, tablet, smartphone, smartwatch or other wearables, appliance, part of the Internet-of-Things, and/or embedded system, to name a few non-limiting examples, or any combination thereof.

Computer system 500 may be a client or server, accessing or hosting any applications and/or data through any delivery paradigm, including but not limited to remote or distributed cloud computing solutions; local or on-premises software ("on-premise" cloud-based solutions); "as a service" models (e.g., content as a service (CaaS), digital content as a service (DCaaS), software as a service (SaaS), managed software as a service (MSaaS), platform as a service (PaaS), desktop as a service (DaaS), framework as a service (FaaS), backend as a service (BaaS), mobile backend as a service (MBaaS), infrastructure as a service (IaaS), etc.); and/or a hybrid model including any combination of the foregoing examples or other services or delivery paradigms.

Any applicable data structures, file formats, and schemas in computer system 500 may be derived from standards including but not limited to JavaScript Object Notation (JSON), Extensible Markup Language (XML), Yet Another Markup Language (YAML), Extensible Hypertext Markup Language (XHTML), Wireless Markup Language (WML), MessagePack, XML User Interface Language (XUL), or any other functionally similar representations alone or in combination. Alternatively, proprietary data structures, formats, and/or schemas may be used, either exclusively or in combination with known or open standards.

In some embodiments, a tangible, non-transitory apparatus or article of manufacture comprising a tangible, non-transitory computer useable or readable medium having control logic (software) stored thereon may also be referred to herein as a computer program product or program storage device. This includes, but is not limited to, computer system 500, main memory 508, secondary memory 510, and removable storage units 518 and 522, as well as tangible articles of manufacture embodying any combination of the foregoing. Such control logic, when executed by one or more data processing devices (such as computer system 500), may cause such data processing devices to operate as described herein.

Based on the teachings contained in this disclosure, it will be apparent to persons skilled in the relevant art(s) how to make and use embodiments of this disclosure using data processing devices, computer systems, and/or computer architectures other than that shown in FIG. 5. In particular, embodiments can operate with software, hardware, and/or operating system implementations other than those described herein.

It is to be appreciated that the Detailed Description section, and not any other section, is intended to be used to interpret the claims. Other sections can set forth one or more but not all exemplary embodiments as contemplated by the inventor(s), and thus, are not intended to limit this disclosure or the appended claims in any way.

Additionally and/or alternatively, while this disclosure describes exemplary embodiments for exemplary fields and applications, it should be understood that the disclosure is not limited thereto. Other embodiments and modifications thereto are possible and are within the scope and spirit of this disclosure. For example, and without limiting the generality of this paragraph, embodiments are not limited to the software, hardware, firmware, and/or entities illustrated in the figures and/or described herein. Further, embodiments (whether or not explicitly described herein) have significant utility to fields and applications beyond the examples described herein.

One or more parts of the above implementations may include software. Software is a general term whose meaning of specified functions and relationships thereof. The boundaries of these functional building blocks have been arbitrarily defined herein for the convenience of the description. Alternate boundaries can be defined as long as the specified functions and relationships (or equivalents thereof) are appropriately performed. Also, alternative embodiments can perform functional blocks, steps, operations, methods, etc. using orderings different than those described herein.

References herein to "an aspect," "aspects," "one embodiment," "an embodiment," "an example embodiment," or similar phrases, indicate that the embodiment described can include a particular feature, structure, or characteristic, but every embodiment can not necessarily include the particular feature, structure, or characteristic. Moreover, such phrases are not necessarily referring to the same embodiment. Further, when a particular feature, structure, or characteristic is described in connection with an embodiment, it would be within the knowledge of persons skilled in the relevant art(s) to incorporate such feature, structure, or characteristic into other embodiments whether or not explicitly mentioned or described herein. Additionally, some embodiments can be described using the expression "coupled" and "connected" along with their derivatives. These terms are not necessarily intended as synonyms for each other. For example, some embodiments can be described using the terms "connected" and/or "coupled" to indicate that two or more elements are in direct physical or electrical contact with each other. The term "coupled," however, can also mean that two or more elements are not in direct contact with each other, but yet still co-operate or interact with each other.

The breadth and scope of this disclosure should not be limited by any of the above-described exemplary embodiments, but should be defined only in accordance with the following claims and their equivalents.

What is claimed is:

1. A computer-implemented method comprising:
   identifying, based on an indication of a first opened instance of a user interface, a second opened instance of the user interface;
   causing, based on identifying the second opened instance of the user interface, display of an instance indication element that comprises a numerical indication of open instances of the user interface;
   causing, based on an interaction with the instance indication element, display of an instance indication window comprising:
      a first sequencing element that indicates a sequence number of an order in which the first opened instance was opened relative to the open instances, a first data field that describes the first opened instance, and a first instance manipulation element that causes the first opened instance to become a currently displayed instance of the user interface when the first instance manipulation element is interacted;
      a second sequencing element that indicates another sequence number of an order in which the second opened instance was opened relative to the open instances, a second data field that describes the second opened instance, and a second instance manipulation element that causes the second opened instance to become the currently displayed instance of the user interface when the second instance manipulation element is interacted; and
   modifying, based on an indication that the first opened instance of the user interface is the currently displayed instance of the user interface, a shape of the first data field of the instance indication window.

2. The computer-implemented method of claim 1, wherein the identifying the second opened instance of the user interface comprises identifying a key-value pair indicative of the second opened instance in a local storage for the user interface.

3. The computer-implemented method of claim 1, wherein a different interaction with the first instance manipulation element for the first data field causes the first opened instance of the user interface to close, and a different interaction with the second instance manipulation element for the second data field causes the second opened instance of the user interface to close.

4. The computer-implemented method of claim 1, further comprising:
  storing a key-value pair indicative of the first opened instance of the user interface in a local storage for the user interface; and
  modifying, based on the stored key-value pair indicative of the first opened instance, the instance indication window to indicate the first data field of the instance indication window that describes the first opened instance of the user interface.

5. The computer-implemented method of claim 1, further comprising modifying, based on an indication that the first opened instance of the user interface is not the currently displayed instance of the user interface, at least one of a color of the first data field or a font of data in the first data field.

6. The computer-implemented method of claim 1, further comprising modifying, based on instructions received via an input component of a user device, the first data field of the instance indication window to include a new description for the first opened instance of the user interface.

7. A non-transitory computer-readable medium having instructions stored thereon that, when executed by at least one computing device, causes the at least one computing device to perform operations comprising:
  identifying, based on an indication of a first opened instance of a user interface, a second opened instance of the user interface;
  causing, based on identifying the second opened instance of the user interface, display of an instance indication element that comprises a numerical indication of open instances of the user interface;
  causing, based on an interaction with the instance indication element, display of an instance indication window comprising:
    a first sequencing element that indicates a sequence number of an order in which the first opened instance was opened relative to the open instances, a data field of the instance indication window describes the first opened instance, and a first instance manipulation element that causes the first opened instance to become a currently displayed instance of the user interface when the first instance manipulation element is interacted;
    a second sequencing element that indicates another sequence number of an order in which the second opened instance was opened relative to the open instances, a second data field that describes the second opened instance, and a second instance manipulation element that causes the second opened instance to become the currently displayed instance of the user interface when the second instance manipulation element is interacted; and
  modifying, based on an indication that the first opened instance of the user interface is the currently displayed instance of the user interface, a shape of the first data field of the instance indication window.

8. The non-transitory computer-readable medium of claim 7, wherein the identifying the second opened instance of the user interface comprises identifying a key-value pair indicative of the second opened instance in a local storage for the user interface.

9. The non-transitory computer-readable medium of claim 7, wherein a different interaction with the first instance manipulation element for the first data field causes the first opened instance of the user interface to close, and a different interaction with the second instance manipulation element for the second data field causes the second opened instance of the user interface to close.

10. The non-transitory computer-readable medium of claim 7, the operations further comprising:
  storing a key-value pair indicative of the first opened instance of the user interface in a local storage for the user interface; and
  modifying, based on the stored key-value pair indicative of the first opened instance, the instance indication window to indicate the first data field of the instance indication window that describes the first opened instance of the user interface.

11. The non-transitory computer-readable medium of claim 7, the operations further comprising modifying, based on an indication that the first opened instance of the user interface is not the currently displayed instance of the user interface, at least one of a color of the first data field or a font of data in the first data field.

12. The non-transitory computer-readable medium of claim 7, the operations further comprising, modifying, based on instructions received via an input component of a user device, the first data field of the instance indication window to include a new description for the first opened instance of the user interface.

13. A system comprising:
  a memory; and
  at least one processor coupled to the memory and configured to perform operations comprising:
    identifying, based on an indication of a first opened instance of a user interface, a second opened instance of the user interface;
    causing, based on identifying the second opened instance of the user interface, display of an instance indication element that comprises a numerical indication of open instances of the user interface;
    causing, based on an interaction with the instance indication element, display of an instance indication window comprising:
      a first sequencing element that indicates a sequence number of an order in which the first opened instance was opened relative to the open instances, a data field of the instance indication window describes the first opened instance, and a first instance manipulation element that causes the first opened instance to become a currently displayed instance of the user interface when the first instance manipulation element is interacted;
      a second sequencing element that indicates another sequence number of an order in which the second opened instance was opened relative to the open instances, a second data field that describes the second opened instance, and a second instance manipulation element that causes the second opened instance to become the currently displayed instance of the user interface when the second instance manipulation element is interacted; and
    modifying, based on an indication that the first opened instance of the user interface is the currently displayed instance of the user interface, a shape of the first data field of the instance indication window.

14. The system of claim 13, wherein the identifying the second opened instance of the user interface comprises identifying a key-value pair indicative of the second opened instance in a local storage for the user interface.

15. The system of claim 13, wherein a different interaction with the first instance manipulation element for the first data field causes the first opened instance of the user interface to close, and a different interaction with the second instance manipulation element for the second data field causes the second opened instance of the user interface to close.

16. The system of claim 13, the operations further comprising:
   storing a key-value pair indicative of the first opened instance of the user interface in a local storage for the user interface; and
   modifying, based on the stored key-value pair indicative of the first opened instance, the instance indication window to indicate the first data field of the instance indication window that describes the first opened instance of the user interface.

17. The system of claim 13, the operations further comprising modifying, based on an indication that the first opened instance of the user interface is not the currently displayed instance of the user interface, at least one of a color of the first data field or a font of data in the first data field.

\* \* \* \* \*